(12) United States Patent
Kobayashi

(10) Patent No.: US 10,059,615 B2
(45) Date of Patent: Aug. 28, 2018

(54) THERMOCHEMICAL REGENERATION AND HEAT RECOVERY IN GLASS FURNACES

(71) Applicant: Hisashi Kobayashi, Bedford, NY (US)

(72) Inventor: Hisashi Kobayashi, Bedford, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/297,471

(22) Filed: Oct. 19, 2016

(65) Prior Publication Data

US 2017/0121206 A1 May 4, 2017

Related U.S. Application Data

(60) Provisional application No. 62/248,013, filed on Oct. 29, 2015.

(51) Int. Cl.
*C03B 5/237* (2006.01)

(52) U.S. Cl.
CPC .................................. *C03B 5/237* (2013.01)

(58) Field of Classification Search
CPC ....................................................... C03B 5/237
USPC ................................................ 65/134.1, 335
See application file for complete search history.

(56) References Cited

U.S. PATENT DOCUMENTS

| | | | |
|---|---|---|---|
| 4,225,332 A * | 9/1980 | Tsay | C03B 3/023 501/29 |
| 4,407,669 A * | 10/1983 | Nelson | C03B 5/237 431/167 |
| 5,773,529 A | 6/1998 | Alexander | |
| 5,921,771 A | 7/1999 | Kobayashi | |
| 6,036,486 A * | 3/2000 | Argent | C03B 5/235 432/179 |
| 6,071,116 A * | 6/2000 | Philippe | C03B 5/235 431/11 |
| 6,113,874 A | 9/2000 | Kobayashi | |
| 6,210,157 B1 * | 4/2001 | Kobayashi | F27D 17/001 432/181 |
| 2010/0081103 A1 | 4/2010 | Kobayashi | |
| 2013/0086950 A1 * | 4/2013 | Huber | C03B 5/167 65/134.5 |
| 2014/0087322 A1 * | 3/2014 | Kang | F23L 15/04 432/29 |
| 2016/0186992 A1 | 6/2016 | Beaudoin et al. | |

(Continued)

FOREIGN PATENT DOCUMENTS

WO 2011/152024 12/2011

OTHER PUBLICATIONS

A. Gonzalez et al, "Optimelt(TM) Regenerative Thermo-Themical Heat Recovery for Oxy-Fuel Glass Furnaces", "75th Conference on Glass Problems", Apr. 8, 2015, pp. 113-120, D01:10.1002/9781119117490.ch10, p. 114, Optimelt heat recovery process, figures 1,3, John Wiley & Sons, Inc., Hoboken, NJ, USA, XP055285013, ISBN: 978-1-119-11747-6.

*Primary Examiner* — Nahida Sultana
(74) *Attorney, Agent, or Firm* — Donald T. Black

(57) ABSTRACT

Gaseous combustion products from a glassmelting furnace after being passed through a regenerator are used to heat glassmaking feed material and pyrolyze organic material on the feed material. Gaseous pyrolysis products and the combustion products are combined with reforming fuel and passed through a regenerator heated in a previous cycle to form syngas which is fed into the furnace and combusted.

11 Claims, 10 Drawing Sheets

(56) References Cited

U.S. PATENT DOCUMENTS

| | | | | |
|---|---|---|---|---|
| 2016/0305656 A1* | 10/2016 | Wu | .......................... | C01B 3/32 |
| 2016/0348904 A1* | 12/2016 | Gangoli | .............. | F27D 99/0033 |
| 2017/0057855 A1* | 3/2017 | Swiler | ..................... | C03B 5/237 |
| 2017/0336070 A1* | 11/2017 | Inskip | ..................... | F23L 15/02 |
| 2018/0057386 A1* | 3/2018 | Hemmann | ................ | C03B 5/24 |

* cited by examiner

THERMOCHEMICAL REGENERATION AND HEAT RECOVERY IN GLASS FURNACES

RELATED APPLICATIONS

This application claims the benefit of U.S. Provisional Application Ser. No. 62/248,013, filed on Oct. 29, 2015, which is incorporated herein by reference.

FIELD OF THE INVENTION

The present invention relates to combustion in furnaces such as glassmelting furnaces, wherein material is fed into the furnace and is heated and/or melted by the heat of combustion that occurs within the furnace.

BACKGROUND OF THE INVENTION

Many different waste heat recovery systems from hot flue gas have been developed for high temperature furnaces. They include regenerators and recuperators to preheat oxidant for combustion such as air and oxygen, waste heat boilers to generate steam, preheaters for solid feed materials to the furnace, and thermo-chemical recuperators and regenerators to heat and reform fuel. In a glass melting furnace fired with fuel and oxygen a single waste heat recovery system such as oxygen heating regenerators as described in U.S. Pat. No. 5,921,771 can recover only a portion of the waste heat available in the hot flue gas. By combining two or more different heat recovery systems in parallel or in series more waste heat from hot flue gas can be recovered. For example a waste heat boiler can be installed in the downstream of a primary high temperature heat recovery system to generate steam and to cool down the flue gas. Another example is to combine oxygen heating regenerators and a thermochemical recuperator or thermochemical regenerators.

U.S. Pat. No. 6,113,874 discloses thermo-chemical heat recovery methods useful with furnaces employing regenerators wherein a stream of combustion products formed in the furnace is passed through a first regenerator to heat the first regenerator and cool the combustion products, and then a portion of the cooled combustion products is combined with fuel to form a mixture which is passed through a second heated regenerator wherein the mixture undergoes an endothermic reaction to form syngas that then passes into the furnace and is combusted.

The present invention comprises an improvement in this heat recovery method by combining a batch or cullet preheating system in the downstream, particularly useful in glass manufacture.

BRIEF SUMMARY OF THE INVENTION

One aspect of the present invention is a method of carrying out combustion in a glassmelting furnace, comprising
(A) combusting fuel in a glassmelting furnace to produce gaseous combustion products, and
(B) alternately
(1)(a) passing gaseous combustion products from the furnace into and through a cooled first regenerator to heat the first regenerator and cool said gaseous combustion products,
(b) passing at least a first part (by which is meant up to 100%) of said cooled gaseous combustion products from said first regenerator in heat exchange with solid glassmaking material which contains organic substances to further cool the cooled gaseous combustion products and heat the glassmaking material and pyrolyze organic substances contained thereon to form pyrolysis products, and
(c) passing the further cooled gaseous combustion products, gaseous pyrolysis products, and fuel, into a heated second regenerator and, in the second regenerator, reacting the gaseous combustion products, gaseous pyrolysis products, and fuel in an endothermic reaction to form syngas comprising hydrogen and CO, and passing said syngas from the second regenerator into the furnace and combusting it in the furnace, and
(d) feeding said heated glassmaking material into said furnace; and
(2)(a) passing gaseous combustion products from the furnace into and through a cooled second regenerator to heat the second regenerator and cool said gaseous combustion products,
(b) passing a first part (by which is meant up to 100%) of said cooled gaseous combustion products from said second regenerator in heat exchange with solid glassmaking material which contains organic substances to further cool the cooled gaseous combustion products and heat the glassmaking material and pyrolyze organic substances contained thereon to form gaseous pyrolysis products, and
(c) passing the further cooled gaseous combustion products, gaseous pyrolysis products, and fuel, into a heated first regenerator and, in the first regenerator, reacting the gaseous combustion products and the fuel in an endothermic reaction to form syngas comprising hydrogen and CO, and passing said syngas from the first regenerator into the furnace and combusting it in the furnace, and
(d) feeding said heated glassmaking material into said furnace.

The heat exchange with the solid glassmaking material can be carried out by direct contact heat exchange, indirect heat exchange, or a combination of direct and indirect heat exchange. In direct contact heat exchange the solid glassmaking material is heated by direct contact with gaseous combustion products and gaseous pyrolysis products formed from the solid glassmaking material mix with the gaseous combustion products. This can be achieved by flowing a stream of the pieces and particles of glassmaking material, and the gaseous combustion products, simultaneously through the same tube or other passageway in which the gas flows through spaces between the pieces and particles and contacts their surfaces to pass heat to the glassmaking material. In indirect contact heat exchange the solid glassmaking material does not directly contact with gaseous combustion products and gaseous pyrolysis products formed from the solid glassmaking material does not mix with the gaseous combustion products within the heat exchange unit. The gas stream and the glassmaking material do not contact each other but are physically separated by a barrier (such as a metal wall between adjacent tubes) that permits heat to flow between the gas and the solid glassmaking material.

As used herein, to "pyrolyze" means to thermally decompose material to form gaseous, liquid and solid products, with or without also causing the material to undergo chemical reaction (such as partial oxidation) that changes the molecular structure or molecular weight of the material or produces reaction products, without fully oxidizing 100% of the material to fully oxidized endproducts such as carbon dioxide and water. As used herein, "gaseous pyrolysis products" are products formed by pyrolysis that are gases and which may contain fine particles of liquid and/or solid transportable in the gas phase.

Another aspect of the present invention utilizes the aforementioned method with preheating of gaseous oxidant that is to be fed to the furnace.

For instance, this aspect is a method of carrying out combustion in a glassmelting furnace, comprising (A) combusting fuel in a glassmelting furnace to produce gaseous combustion products, and (B) alternately (1)(i) passing a first amount of gaseous combustion products from the furnace into and through a cooled first regenerator to heat the first regenerator and cool said first amount of gaseous combustion products, (ii) passing a second amount of gaseous combustion products from the furnace into and through a cooled second regenerator to heat the second regenerator and cool said second amount of gaseous combustion products, (iii) passing cooled gaseous combustion products from said first regenerator, from said second regenerator, or from both said first and second regenerators, in heat exchange with solid glassmaking material which contains organic material, to further cool the cooled gaseous combustion products and heat the glassmaking material and pyrolyze organic material in the glassmaking material, to form gaseous pyrolysis products, and feeding said heated glassmaking material into said furnace, (iv) passing reforming fuel, further cooled gaseous combustion products, gaseous pyrolysis products, and cooled gaseous combustion products from said first regenerator, cooled gaseous combustion products from said second regenerator, or cooled gaseous combustion products from both of said first and second regenerators, into a heated third regenerator, (v) reacting the gaseous combustion products and the reforming fuel and gaseous pyrolysis products in the third regenerator in an endothermic reaction under conditions effective to form syngas comprising hydrogen and carbon monoxide, and thereby cooling the third regenerator, (vi) passing gaseous oxidant into and through a heated fourth regenerator to heat the gaseous oxidant and cool the fourth regenerator, and (vii) passing said syngas and any unreacted pyrolysis products from said third regenerator into said furnace, passing said heated gaseous oxidant from the fourth regenerator into the furnace, and combusting the syngas, any unreacted pyrolysis products, and said heated gaseous oxidant in the furnace;

while maintaining the difference in temperatures of the combustion products passing out of said first and second regenerators at 300 F. or less; and (2)(i) passing a first amount of gaseous combustion products from the furnace into and through a cooled third regenerator to heat the third regenerator and cool said first amount of gaseous combustion products, (ii) passing a second amount of gaseous combustion products from the furnace into and through a cooled fourth regenerator to heat the fourth regenerator and cool said second amount of gaseous combustion products, (iii) passing cooled gaseous combustion products from said third regenerator, from said fourth regenerator, or from both said third and fourth regenerators, in heat exchange with solid glassmaking material which contains organic material, to further cool the cooled gaseous combustion products and heat the glassmaking material and pyrolyze organic material in the glassmaking material, to form gaseous pyrolysis products, and feeding said heated glassmaking material into said furnace, (iv) passing reforming fuel, further cooled gaseous combustion products, gaseous pyrolysis products, and cooled gaseous combustion products from said third regenerator, cooled gaseous combustion products from said fourth regenerator, or cooled gaseous combustion products from both of said third and fourth regenerators, into a heated first regenerator, (v) reacting the gaseous combustion products and the reforming fuel and pyrolysis products in the first regenerator in an endothermic reaction under conditions effective to form syngas comprising hydrogen and carbon monoxide, and thereby cooling the first regenerator, (vi) passing gaseous oxidant into and through a heated second regenerator to heat the gaseous oxidant and cool the second regenerator, and (vii) passing said syngas and any unreacted pyrolysis products from said first regenerator into said furnace, passing said heated gaseous oxidant from the second regenerator into the furnace, and combusting the syngas, any unreacted pyrolysis products, and said heated gaseous oxidant in the furnace;

while maintaining the difference in temperatures of the combustion products passing out of said third and fourth regenerators at 300 F. or less.

BRIEF DESCRIPTION OF THE DRAWINGS

FIGS. 2 and 3 are cross-sectional views of portions of the embodiments of FIGS. 1 and 1a.

FIGS. 5 and 6 are cross-sectional views of portions of the embodiment of FIGS. 4 and 4a.

DETAILED DESCRIPTION OF THE INVENTION

Figure 1:
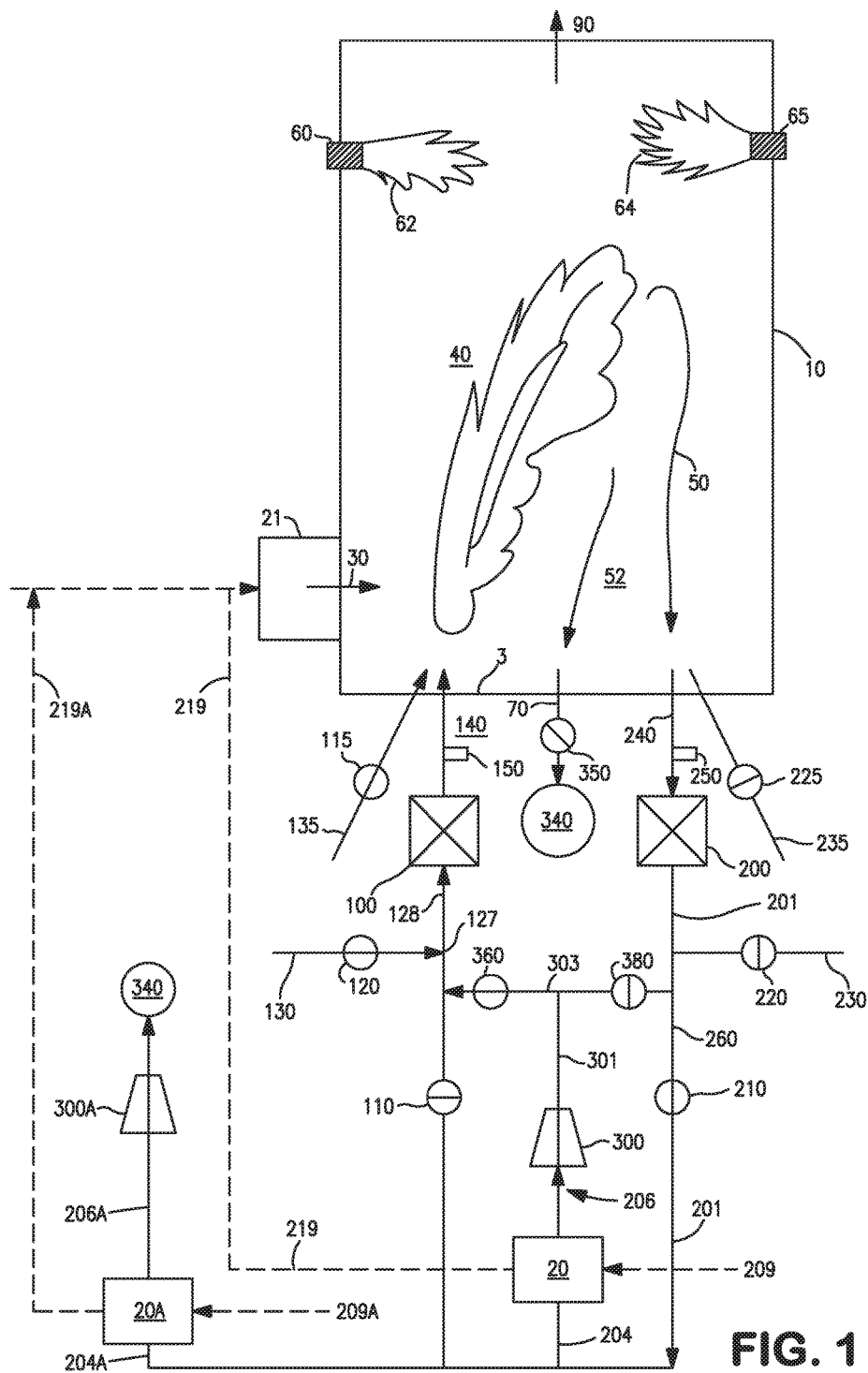
FIGS. 1 and 1a are flowsheets of embodiments of the present invention.

The present invention is useful in furnaces such as glassmelting furnaces, furnaces for heating and/or melting metals and ores; incinerators; cement kilns; and the like, wherein material is fed into the furnace and is heated and/or melted by the heat of combustion that occurs within the furnace. The combustion occurs between fuel, which can be any combustible gaseous hydrocarbon or atomized liquid hydrocarbon (preferably comprising C1-C4 compounds such as methane) as well as the syngas that is produced as described herein, and gaseous oxidant which includes air and any gaseous mixture containing more oxygen than air.

The present invention is described herein in particular detail with respect to a preferred type of furnace, namely one that employs a heat recovery process which recaptures usable heat from high temperature flue gas exhaust streams. This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, by which is meant combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher $H_2O$ and $CO_2$ concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another regenerator and mixed with a stream of fuel (referred to herein as Reforming Fuel or RF). In the following description, pure methane (CH4) is described as reforming fuel for purposes of illustration. Other satisfactory reforming fuels include any combustible gas containing significant concentration of hydrocarbons, gas mixture, or vaporized liquid fuels including, but not limited to, natural gas, propane, and LPG (liquefied petroleum gas). Fuels that predominantly comprise H2 and CO such as producer gas generated by gasifying coal are not suitable as Reforming Fuel. Thus, the reforming fuel should comprise at least 25 vol. % of one or more gaseous hydrocarbons of the formula $CH_4$ and/or $C_XH_Y$ wherein X is 2-4 and Y is X to (4X−2).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RGF/RF mixture passes through the second regenerator, it reaches a temperature at which thermal dissociation reactions and reforming reactions begin to occur and continue to occur, producing products including H2 and CO. These reactions are endothermic and the heat needed to promote these reactions is absorbed from the heated checker. Thermal dissociation reactions of fuel are known as cracking reactions and produce many fuel species such as H2, C2H2, C2H4, and soot. The reforming reactions produce a gaseous composition which typically comprises one or more components such as such as H2, CO, and unreacted gases comprising H2O, CO2 and CH4. The gaseous composition thus produced may also be called "syngas" herein. The mixture of gaseous products emerges from the second regenerator into the furnace wherein the combustible gaseous components are combusted with oxidant to provide thermal energy for heating and/or melting material in the furnace. This combustion may combust a portion of any soot present with the gaseous products as well.

As described more fully below, gaseous oxidant for combustion in the furnace is heated before it is fed into the furnace. It is heated by passing it into and through a regenerator that has previously been heated. At the same time, a portion of the gaseous combustion products formed in the furnace are passed out of the furnace through another regenerator, to heat that regenerator.

After a length of time, the operation of the two regenerators is reversed, i.e., the regenerator that was used in the flue cycle is switched to the reforming cycle, and the regenerator that was used in the reforming cycle is switched to the flue cycle. Prior to the reversal the flow of reforming fuel is stopped and the RFG flow is continued until some or all of the residual reforming fuel and syngas in the regenerator are purged out of the regenerator and combusted in the furnace. This purging step also acts to remove soot deposited on checker surfaces in the regenerator as soot reacts with RFG and is gasified. Upon this reversal, the regenerator that was heated by outgoing flue gas is switched to start heating incoming oxidant, and the regenerator that was used to heat incoming oxidant is switched so that flue gas exiting the furnace passes through it in order to reheat it for use in heating oxidant. After a further period of time, the operation of the two pairs of regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of one aspect of the present invention is described below in conjunction with FIGS. 1 to 3. An end-port fired glass furnace (10) fitted with two regenerators in end wall (3) is used as an example.

As shown in FIG. 1, end-port glass furnace (10) has a feeder (21) where feed material (30) comprising solid glass-making materials (known as batch and/or cullet) are charged into the furnace to be heated and melted. Heating station (20) and optional heating station (20A) are further described below. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
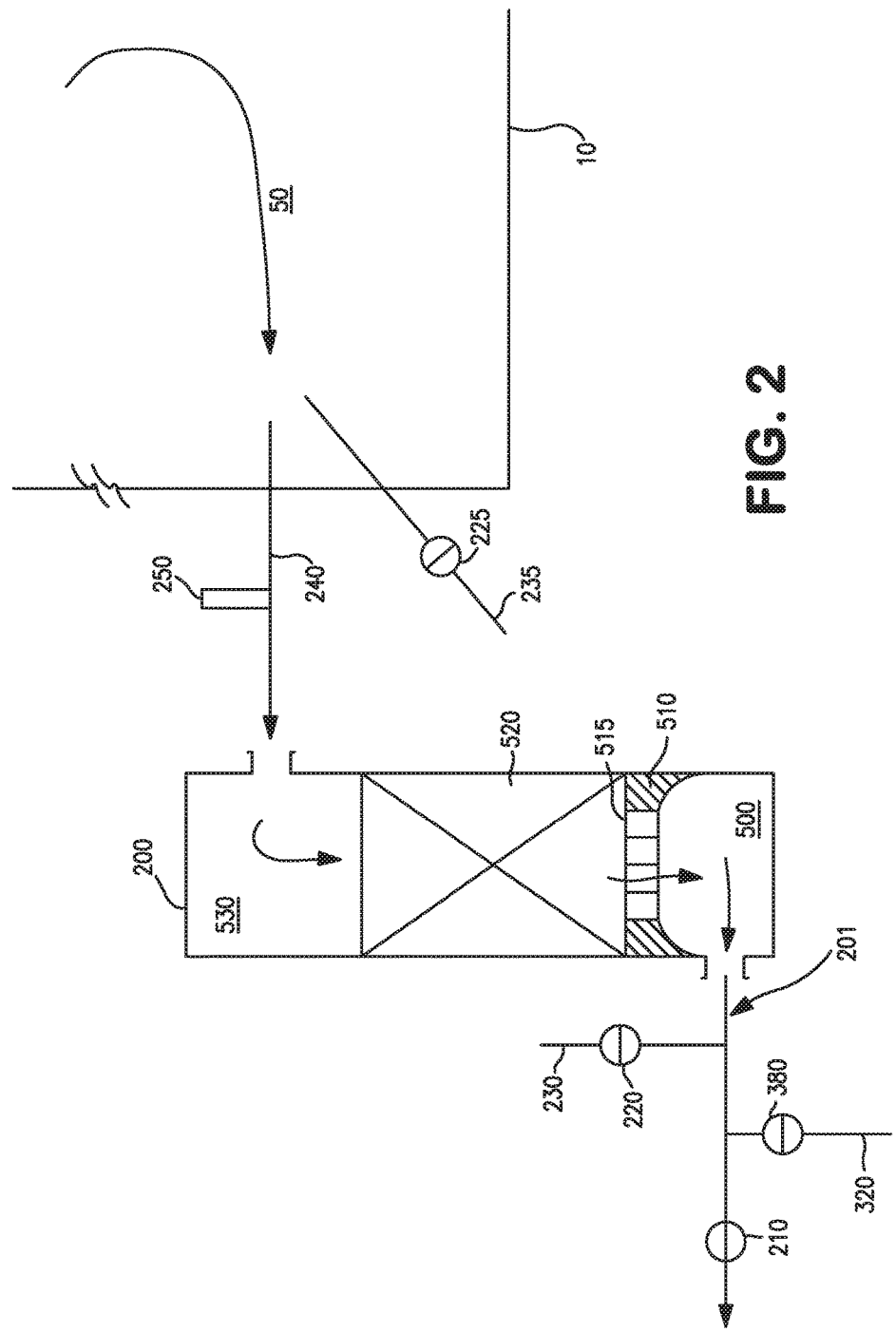

As seen in FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 1, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210), split into two stream (204) and (204A).

Glassmaking material (209) is fed into feed station (20) in which the glassmaking material can be heated and then fed into furnace (10). Glassmaking material (209) includes solid material which when melted forms molten glass which can then be formed into glass articles. The glassmaking material can include material known as cullet, which comprises pieces of glass such as recycled glass containers and bottles. Glassmaking material in stream (209), especially cullet, contains organic matter in or on it, by which is meant any solid, semi-solid or liquid substance(s) having in the molecular structure at least carbon and hydrogen, and also optionally oxygen. Examples of organic matter include carbohydrates, hydrocarbons, polymers, fatty acids, waxes, fats and other glycerides, and include matter such as paper and adhesive matter. The glassmaking material (209) may also contain materials which when melted form glass or enter into reactions to form glass. Such materials are known as "batch"; examples include silica sand, soda ash, limestone, dolomite, other carbonates, sulfates, oxides and hydroxides of sodium, calcium, magnesium and potassium. The batch materials if present may also contain organic matter therein.

Stream (201) of cooled gaseous combustion products (flue gas) is split into two streams (204) and (204A). Stream (204) is Recycled Flue Gas (RFG) to be used as reactants in regenerator (100) for reforming reactions. Stream (204) passes into and through station (20) where it heats the glassmaking materials (209) in station (20) and is thereby further cooled. The further cooled flue gas (206) contains gaseous pyrolysis products from glassmaking materials (209) and exits station (20), passes through ID (induced draft) fan 300 and valve (360), mixes with reforming fuel from stream (130) at location (127) and feeds into the bottom of regenerator (100) as stream (128). Reforming fuel which is to be fed to the regenerator (100) is supplied by a conduit (130) through valve (120). Suitable reforming fuels include methane (which is preferred) as well as any other combustible gas, gas mixture, or vaporized liquid fuels including, but not limited to, natural gas, propane, and LPG (liquefied petroleum gas).

Heated glassmaking material 219 which is produced from station (20) is fed into furnace (10) through feeder (21).

Stream (204A) of cooled gaseous combustion products is passed into optional batch/cullet heating unit (20A), wherein stream (204A) heats glassmaking material (209A) that is separately fed to unit (20A). In this embodiment, glassmaking material (209A) can be batch or cullet but should be substantially free of organic matter. The glassmaking material (209A) that is heated in station (20A) is fed into furnace (10). The further cooled flue gas (206A) exits station (20A), passes through ID fan (300A) and can be passed to exhaust (340). Heated glassmaking material (219A) is fed into furnace (10) through feeder (21).

It should be noted that station (20A) can instead be any other heat recovery component that usefully employs the heat contained in stream (204A). Examples of other heat recovery components include a boiler that converts feedwater to steam.

Heat exchange between stream (204) and glassmaking materials, and between stream (204A) and glassmaking materials, is preferably by direct heat exchange, which is preferred, but may be by indirect heat exchange or a combination of direct and indirect heat exchange.

In station (20), the gas stream (204) pyrolyzes organic matter that the glassmaking material contains. The gaseous pyrolysis products unite with gas stream (206) that exits station (20). Direct heat exchange facilitates this uniting, as the gaseous pyrolysis products immediately join the gas stream upon pyrolysis. When indirect heat exchange is employed, the heated glassmaking materials can be separated by known manner from the gas with which it is entrained as they exit the indirect heat exchanger, and by suitable ducting the recovered gas stream containing the gaseous pyrolysis products can be fed into the stream (206).

Figure 1A:
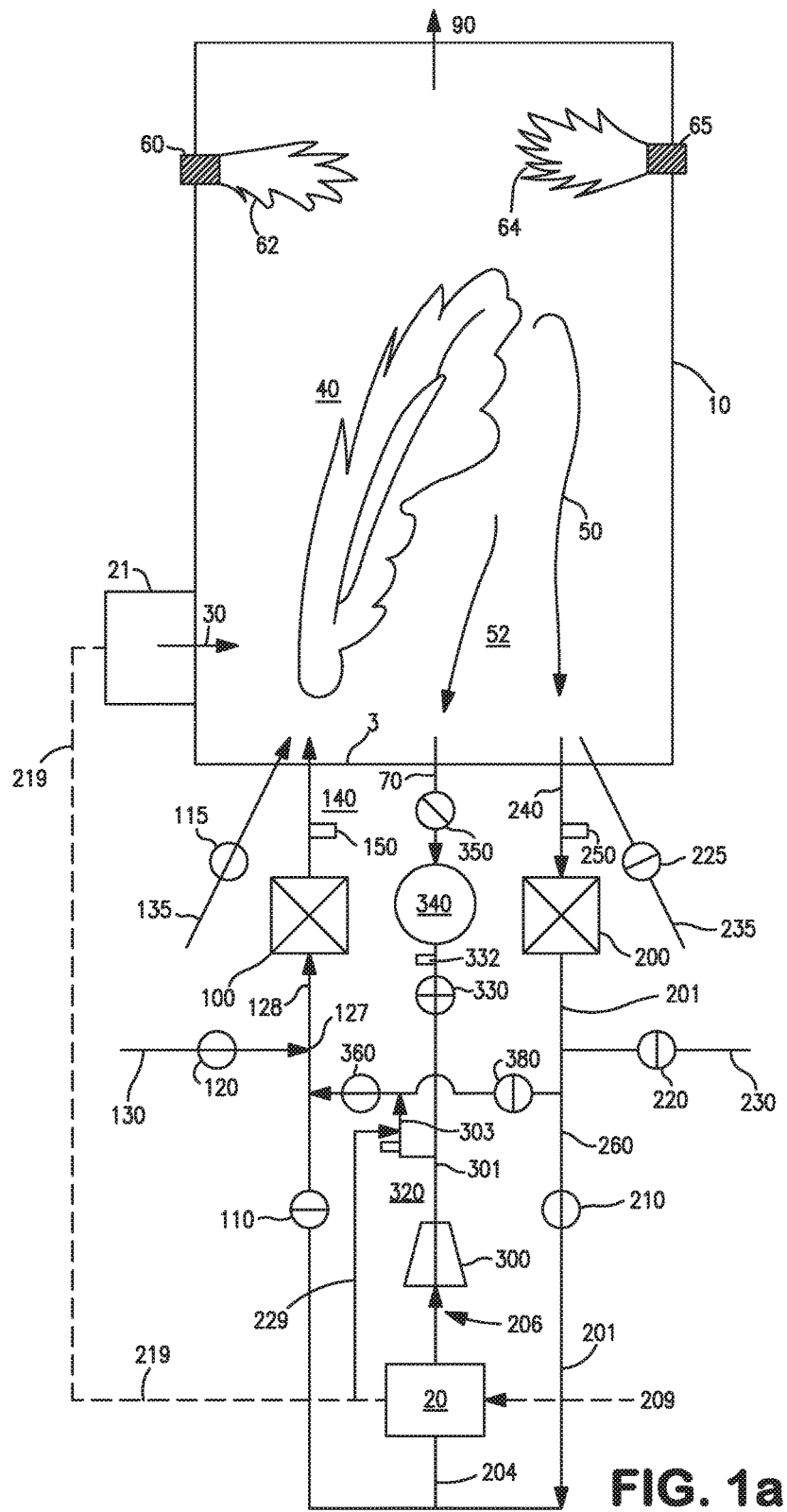

FIG. 1a depicts an arrangement in which station (20) employs indirect heat exchange. The gaseous pyrolysis products (229) does not join the stream (206) in this arrangement, but is mixed into the recycled flue gas (RFG) stream (303) and fed into the reforming regenerator (100). Flue gas stream (301) is free of the gaseous pyrolysis products (229) and exhausted into the stack (340).

The pyrolysis does not fully convert all organic matter present to fully oxidized forms, i.e., carbon dioxide and water. Thus, pyrolysis products include compounds that can participate in reactions such as reforming and combustion. Any pyrolysis products that do not react in the reforming reactions in regenerators (100) and (200) pass into furnace (10) and are fully combusted there.

The gas stream (204) as it contacts the glassmaking material in station (20) is typically at a temperature of 800 F. to 1200 F. Softening and sticking of some of glassmaking materials may take place at temperature of 1000 F. or lower, which may prevent smooth flow of glassmaking materials in station 20. The maximum gas temperature of stream (204) should be controlled to avoid sticking problems. The glassmaking material entering station (20) may be at ambient temperature or higher. The glassmaking material containing organic matter should be heated by the gas stream (204) to a temperature of at least 300 F., preferably to at least 500 F. This is achieved by appropriate adjustment of the temperature of gas stream (204), and of the length of time that the gas and the glassmaking material are in contact with each other. Suitable equipment for providing the desired gas-solids contact is known in this technical field.

Figure 3:
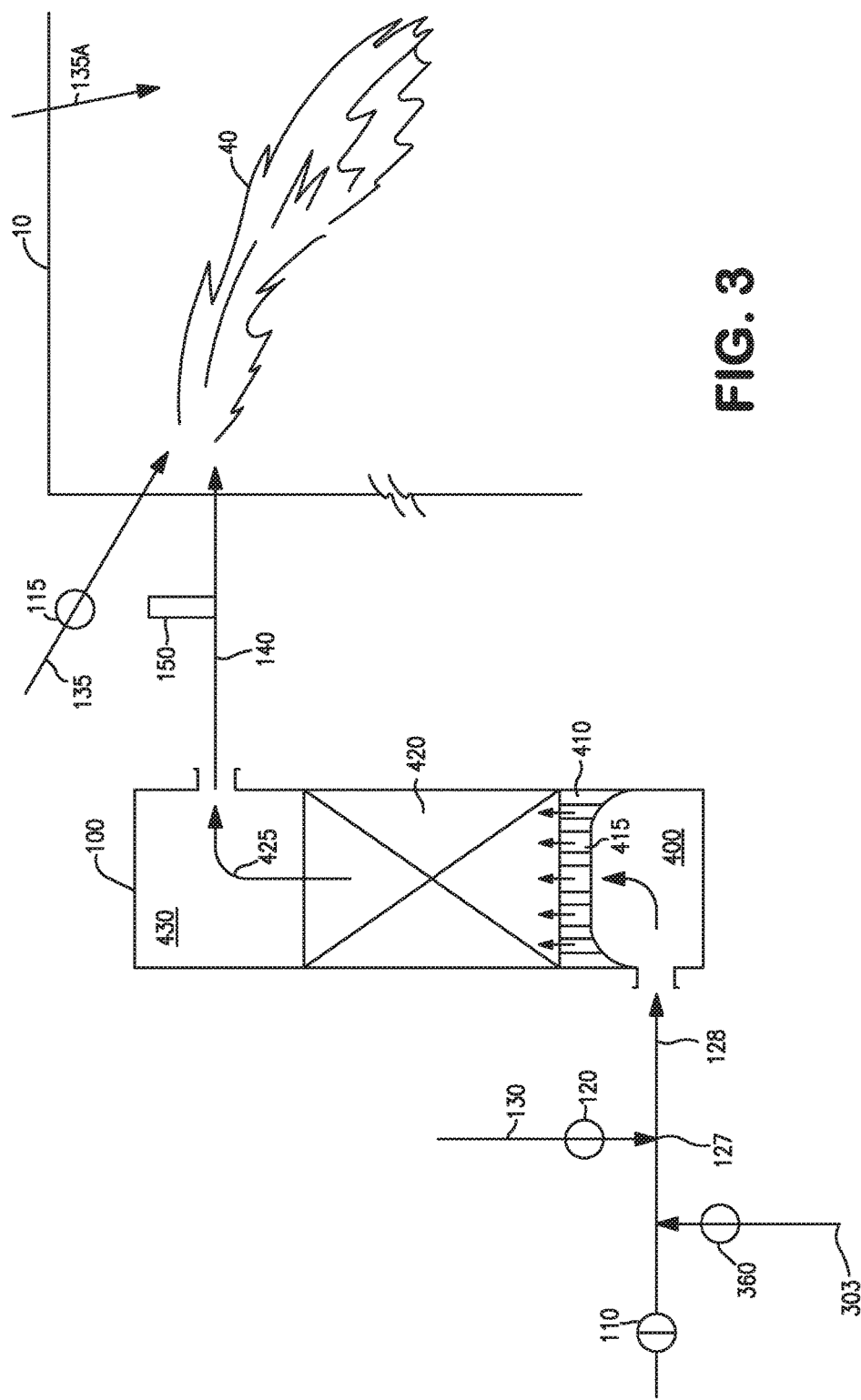

As seen in FIG. 3, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF becomes sufficiently high and reaches reforming temperature, thermal dissociation reactions and endothermic reforming reactions occur in which the reforming fuel (e.g. CH4) reacts with CO2 and H2O in the RFG and forms CO, H2, and possibly soot. The required heat for the endothermic reforming reactions is taken from the heated checkers. The reforming reaction continues as the RFG/RF mixture continues to travel toward the top space (430). The gaseous stream (425) (referred to herein as a "reformed" or "syngas" gas stream) exits from the top of checker pack (420). Stream (425) has high temperature and may include species such as CO, $H_2$, soot, unreacted $CH_4$, and unreacted $CO_2$ and $H_2O$. The stream (425) passes through port neck (140) and oxygen sensor (150), and enters furnace (10). This stream exits checker pack (420) at temperatures for example ranging from 1800 F. to 2500 F.

Oxidant for combustion of the syngas is supplied by a conduit (135) with an opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). In this instance, reforming fuel supplied to the regenerator is terminated at first by closing valve (120) while letting the flow of RFG from blower (300) continue. Remaining syngas in regenerator (100) is purged by the RFG (for example, in the manner described below) for a specified amount of time so that nearly all the syngas in the regenerator is expelled to the furnace and combusted to completion.

Upon reversal, the flue gas from the furnace passes through regenerator (100), wherein regenerator (100) is heated and the flue gas is cooled, and a portion thereof passes to exhaust (as defined herein), and a portion (or the balance) of the flue gas is passed to station (20) or also to station (20A), and a portion or the balance of the flue gas does not pass through stations (20) and (20A). Flue gas that does not pass to exhaust, that passes through station (20) or bypasses those stations, is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through station (20) and blower (300), and to permit stream (320) which is a portion (204) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas and further cooled flue gas containing gaseous pyrolysis products, undergoes in regenerator (200) the endothermic reforming reactions which had occurred in regenerator (100) in the previous cycle as described herein, to produce stream (425) of syngas which passes into furnace (10) where it is combusted with oxidant (235) that is fed through valve (225).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (i.e. (100) or (200) as the case may be) is undergoing the purging sequence described above. For maximum heat recovery, it is preferred that burners (60) and (65) are not co-firing with the syngas flame (40). It is also preferred that during the purging sequence, burners (60) and (65) are not firing.

The present invention can also be used in embodiments in which oxidant for combustion in the furnace is preheated in regenerators that are cyclically preheated by gaseous combustion products from the furnace. That is, referring to FIGS. 4, 4a, 5 and 6, heated oxidant for combustion of the syngas is supplied to furnace (10) through conduit (135). The oxidant can be air, or it can have an oxygen content higher than that of air, i.e. at least 21 vol. %, and preferably equal to or higher than 80 vol. %, more preferably equal to or higher than 90 vol. %, or even at least 99 vol. %. The oxidant is provided from a suitable source such as a storage tank or an air separation unit (examples of which are known and commercially available) through conduit (605) and into and through heated regenerator (600). Regenerator (600) can have the customary structure and mode of operation in which checker pack (691) is supported on arch (692) through which gas passages (693) are present that permit gas to flow between the checker pack (691) and bottom space (694). In this cycle of operation, gaseous oxidant flows from line (606) into bottom space (694), into and through checker pack (691), to top space (695) and into line (135). The oxidant is heated in regenerator (600) and passes from regenerator (600) into conduit (135) and into the furnace. Valve (115) is open to permit flow of oxidant into line (606) through which oxidant passes into regenerator (600). Valve (620), which controls flow of flue gas through and out of regenerator (600) into conduit (610) which is connected to the inlet (suction-side) of blower (300), is closed in this cycle. In the other cycle, described herein, the valve positions are reversed, and flue gas flows from line (135) into and through regenerator (600) in the opposite path to line (606).

Figure 4:
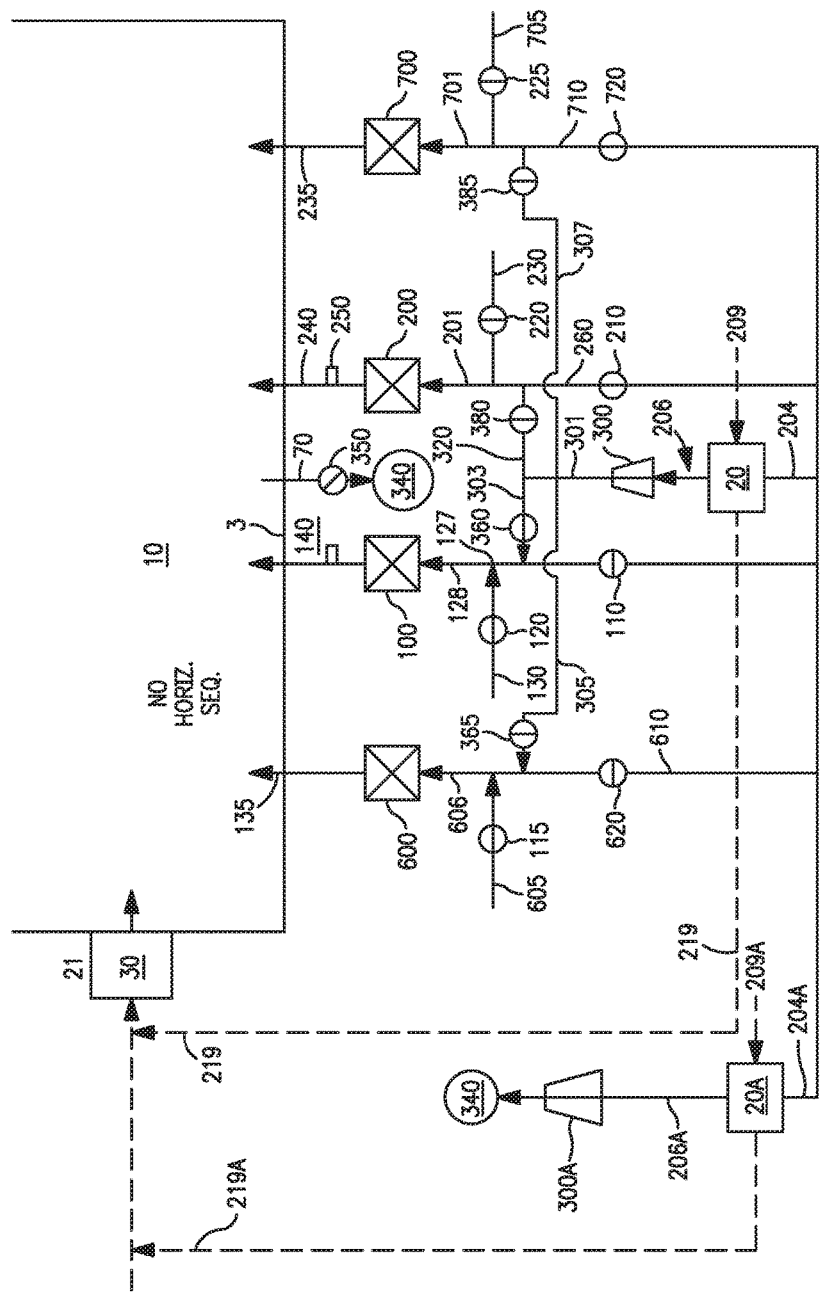
FIGS. 4 and 4a are flowsheets of other embodiments of the present invention.
Figure 4A:
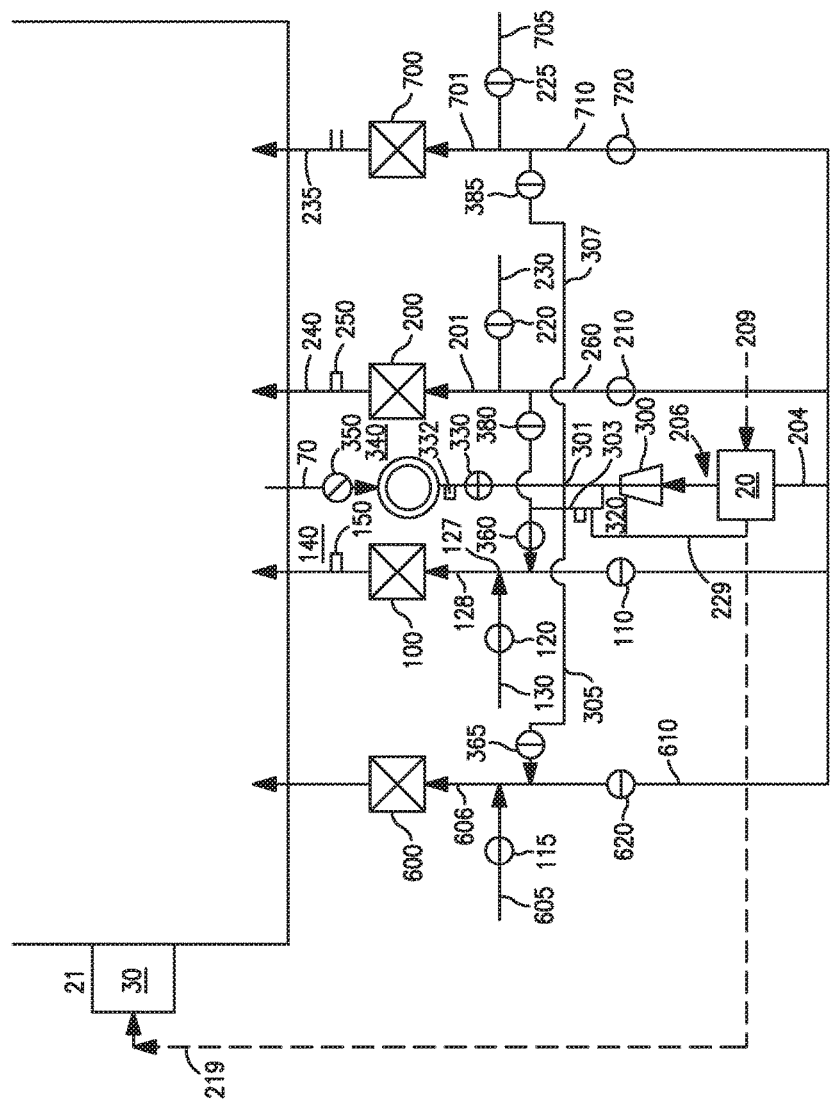
Figure 5:
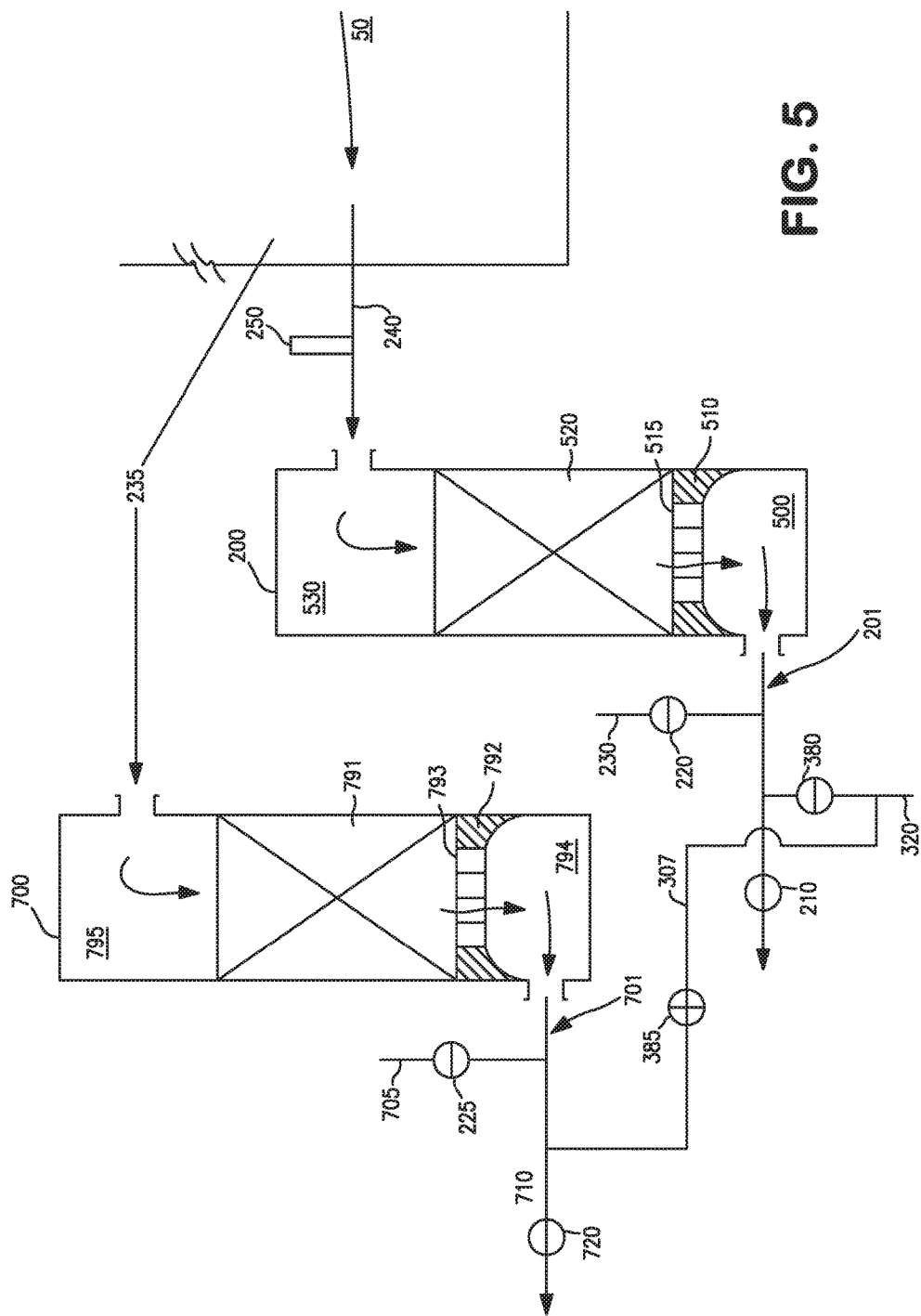

In this cycle of operation, referring to FIGS. 4, 4a and 5, some of the gaseous combustion products (flue gas) passes out of the furnace (10) into conduit (235) and thence into and through regenerator (700). Regenerator (700) can have the customary structure and mode of operation in which checker pack (791) is supported on arch (792) through which gas passages (793) are present that permit gas to flow through top space (795) and through the checker pack (791) to bottom space (794). This flow of combustion products from line (235) heats regenerator (700). The combustion products are cooled and exit regenerator (700) via conduits (701) and (710). Valve (720), which controls flow of flue gas through and out of regenerator (700) into conduits (701) and (710), is open in this cycle, and valve (225) which controls flow of oxidant from a suitable source such as a storage tank or an air separation unit from conduit (705) into and through heated regenerator (700) in the next cycle, is closed. In the other cycle, described herein, the valve positions are reversed, and flue gas flows from line (710) into and through regenerator (700) in the opposite path and passes through to line (235) into furnace (10).

In addition, referring again to FIGS. 4, 4a and 5, stream (710) of cooled flue gas passes through valve (720), joins line (204), and passes into station (20) so that the flue gas from regenerator (700) can also be used to preheat glassmaking material and to pyrolyze organic matter present on glassmaking material (209) fed to station (20). Where an optional second station (20A) is also used, line (204A) can convey flue gas from line (710) into station (20A).

Stream (206) in this embodiment contains further cooled flue gas obtained from regenerator (200) or from regenerator (700) or from both of regenerators (200) and (700). Stream (206) also contains gaseous pyrolysis products which as disclosed above are formed from organic matter in the glassmaking material.

FIG. 4a depicts an arrangement in which station (20) employs indirect heat exchange. The gaseous pyrolysis products (229) does not join the stream (206) in this arrangement, but is mixed into the recycled flue gas (RFG) stream (303) and fed into the reforming regenerator (100). Flue gas stream (301) is free of the gaseous pyrolysis products (229) and exhausted into the stack (340).

The heat exchange between flue gas from the oxidant regenerators (600) and (700) and the glassmaking material containing organic matter also produces gaseous pyrolysis products as described above, which are contained in the gas streams (also containing RF and RFG) that alternately pass into regenerators (100) and (200), and in which endothermic reforming reactions occur to produce syngas that passes into furnace (10) and is combusted. Any unreacted pyrolysis products that did not react in the reforming reactions passes into the furnace and are completely combusted in the furnace.

When the regenerator for heating oxidant is cooled sufficiently, and the other regenerator that will heat oxidant is heated sufficiently, the cycles are reversed. At that point, flue gas is passed from furnace (10) through regenerator (600) then through valve (620) to station (20) and optional station (20A).

Typically, the heat recovery process proceeds with one of the regenerators (100) and (200) in the flue cycle and one of these regenerators in the reforming cycle, as seen in FIG. 4, and with one of the oxidant regenerators (600) and (700) in oxidant-heating mode and one being reheated by flue gas passing through it, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, and oxidant was heated in regenerator (600) and fed into the furnace while gaseous combustion products were leaving furnace (10) and heating regenerator (700), the operation of furnace (10) undergoes reversal in which regenerator (200) is transitioned to the reforming cycle for heat recovery, regenerator (100) is transitioned into the flue cycle for heat accumulation, regenerator (600) is transitioned to receive flue gas in order to reheat regenerator (600), and regenerator (700) is transitioned to receive and heat oxidant passing through it into the furnace. Before the reversal, remaining syngas in regenerator (100) and remaining oxidant in regenerator (600) are to be purged to furnace (10). In this instance, reforming fuel supplied to the regenerator (100) and oxidant supplied to regenerator (600) are terminated at first by closing valve (120) and valve (115) respectively and opening oxidant purge line valve (365) to let RFG from blower (300) flow through lines (320) and (305) through valve (365) to line (606). Remaining syngas in regenerator (100) and remaining oxidant in regenerator (600) are purged by the RFG for a specified amount of time so that nearly all the syngas in the regenerator (100) and all of the oxidant in regenerator (600) are expelled to the furnace and combusted to completion.

Upon reversal, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) which had been closed is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas undergoes in regenerator (200) the endothermic reforming reactions which had occurred in regenerator (100) in the previous cycle as described herein, to produce syngas which passes into and through port neck (240) and then into furnace (10) where it is combusted with oxidant from conduit (237) that has been heated after being fed through valve (225). In addition, upon reversal, flue gas passes through regenerator (600) and the flow of oxidant through regenerator (600) is shut off, whereas flow of flue gas from the furnace through regenerator (700) is shut off and flow of oxidant through regenerator (700) into the furnace commences. Valves (115) and (720) are closed, and valves (620) and (225) are opened.

Before the reversal, remaining syngas in regenerator (200) and remaining oxidant in regenerator (700) are to be purged to furnace (10). In this instance, reforming fuel supplied to the regenerator (200) and oxidant supplied to regenerator (700) are terminated at first by closing valve (220) and valve (225) respectively and opening oxidant purge line valve (385) to let RFG flow from blower (300) from line (301) through line (307) to lines (710) and (701). Remaining syngas in regenerator (200) and remaining oxidant in regenerator (700) are purged by the RFG for a specified amount of time so that nearly all the syngas in the regenerator (200) and all of the oxidant in regenerator (700) are expelled to the furnace and combusted to completion.

Thus it can be seen that in one cycle, recycled flue gas (721) that is fed with reforming fuel (130) and gaseous pyrolysis products to regenerator (100) can comprise recycled flue gas from regenerator (200), recycled flue gas from regenerator (700), or recycled flue gas from both regenerators (200) and (700). In the other cycle, recycled flue gas (610) that is fed with reforming fuel (230) and gaseous pyrolysis products to regenerator (200) can comprise recycled flue gas from regenerator (100), recycled flue gas from regenerator (600), or recycled flue gas from both regenerators (100) and (600).

The gas stream (204) as it contacts the glassmaking material in station (20) is typically at a temperature of 800 F. to 1200 F. Softening and sticking of some of glassmaking materials may take place at temperature of 1000 F. or lower, which may prevent smooth flow of glassmaking materials in station 20. The maximum gas temperature of stream (204) should be controlled to avoid sticking problems. The glassmaking material entering station (20) may be at ambient temperature or higher. The glassmaking material containing organic matter should be heated by the gas stream (204) to a temperature of at least 300 F., preferably to at least 500 F. This is achieved by appropriate adjustment of the temperature of gas stream (204), and of the length of time that the gas and the glassmaking material are in contact with each other. Suitable equipment for providing the desired gas-solids contact is known in this technical field.

The present invention utilizes the above-described apparatus and procedures to attain unexpected advantages.

One advantage is that the heating value of the organic matter is utilized in the furnace, which adds to the efficiency of the overall method. Another advantage is that the method avoids the risk of odors and emissions liabilities that could be presented if cullet material containing organic matter is simply fed directly into the furnace. Yet another advantage is that the size and the cost of flue gas recycle equipment required for the overall TCR process is substantially reduced because of the much cooler temperature of the cooled flue gas that exits the station (20). In the normal TCR process the cooled flue gas temperature is about 1200 to 1400 F. and a portion of this stream is recycled to create the reforming gas mixture. The recycled flue gas loop contains a fan, ducts and many valves, all of which have to be able to handle high gas temperature requiring expensive stainless steel. By comparison the temperature of the cooled flue gas is expected to be in a range of 200 to 500 F. depending on the amount of cullet available for preheating. Thus actual volume flow rate of the recycled flue gas (and hence the size of the fan, ducts and valves in the recycled flue gas loop) is substantially reduced.

Also, in the embodiments that employ oxygen preheating in regenerators (FIGS. 4-6), it has been unexpectedly discovered that in each such cycle, the pair of regenerators through which gaseous combustion products are passed should be operated so as to maintain either or both of two sets of conditions. One set of conditions is that the ratio between the molar flow rate of the gaseous combustion products flowing from the regenerator that will be used to provide heat to the endothermic reaction in the next cycle, and the molar flow rate of the gaseous combustion products flowing from the regenerator that will be used to preheat oxidant that will be heated and passed into the furnace in the next cycle, should be maintained so that this ratio is less than 70:30 when the RFG/RF molar ratio is 1:1 and the ratio of the molar flue gas flow rate to the molar RFG/RF mixture flow rate is 2:1. Preferably this ratio is less than 65:45, and at least 55:45. A more preferred range for this ratio is (57 to 65):(43 to 35).

Contrary to the prior teaching of U.S. Pat. No. 6,113,874 the present inventor has also discovered that it is advantageous to operate the reforming regenerator at RFG/RF molar ratio below 0.5, or even without RFG flow, i.e., at RFG/RF molar ratio of 0, when oxidant to be fed into the furnace is heated in a separate regenerator that has been heated by flowing flue gas through it from the furnace. When no RFG is mixed with RF, no reforming reactions can take place; however, some of the fuel components will crack to form hydrogen, $C_2H_4$, $C_2H_2$, soot, and many other species. These cracking reactions are also endothermic and contribute to the recovery of heat into the gaseous species from the regenerator. When no recycled flue gas is mixed with "reforming fuel", the ratio between the molar flow rate of the gaseous combustion products flowing from the regenerator that was used to heat the regenerator and thus provide heat to the endothermic reaction in the next cycle, and the molar flow rate of the gaseous combustion products flowing from the regenerator that was used to preheat oxidant that will be heated and passed into the furnace in the next cycle, should be maintained so that this ratio is less than 65:35. Preferably this ratio is less than 60:40, and more preferably at least 50:50. A more preferred range for this ratio is (55 to 60):(45 to 40).

It is particularly advantageous that the total amount of combustion products exiting the furnace are those in the two ducts feeding combustion products into the regenerators. The desired relationship between the respective molar flow rates can be monitored and implemented by appropriate metering devices in the conduit placed downstream of each regenerator, and by appropriate setting of the valves that regulate the rate of flow of gases in each conduit. For instance, in one cycle these molar flow rates are those in conduit (201) and (710), and in the other cycle these molar flow rates are those in conduits (128) and (610).

Another set of conditions to maintain, in the embodiment of the present invention which includes cyclic use of regenerators to preheat oxidant, is to provide that the temperatures of the flows of gaseous combustion products exiting each pair of regenerators through which combustion products flow in each alternating cycle (that is, referring to FIG. 1, regenerators (200) and (700) in one cycle, and regenerators (100) and (600) in the other cycle, should be within 300 F. or less of each other, preferably within 200 F., and more preferably within 100 F. or less of each other. Stated another way, the temperature difference between these two flows of gaseous combustion products should be 300 F. or less, preferably 200 F. or less, more preferably 100 F. or less. Referring to FIG. 4, this refers to the difference between the temperatures of streams (201) and (710) in one cycle, and the difference between the temperatures of streams (128) and (610) in the other cycle. These temperatures can readily be measured and compared using equipment that is conventional and commercially available. One advantageous manner for maintaining the respective temperature differences within the indicated proximity to each other is by adjusting the molar flow rates of each of the streams of combustion products from the furnace into and through each regenerator that is heated by the combustion products in a given cycle.

Typical temperatures are provided here for operation of the invention with a glassmaking furnace.

Flue gas stream (240) entering regenerator (200) is typically at 2500 F. to 3000 F., and stream (201) exiting regenerator (200) is typically at 500 F. to 1000 F. Stream (235) entering regenerator (700) is also typically at 2500 F. to 3000 F., and stream (701) exiting regenerator (700) is typically at 500 F. to 1000 F. Stream (128) of mixed recycled flue gas and reforming fuel entering regenerator (100) is typically at 300 F. to 1000 F., and stream (140) of reformed product is typically at 1800 F. to 2400 F. Stream (606) of oxidant entering regenerator (600) is typically at zero degrees F. or ambient temperature, up to 100 F. Stream (135) of heated oxidant exiting regenerator (600) is typically at 1800 F. to 2400 F.

The temperatures within each regenerator will be expected to rise and fall through each cycle, and the temperatures will be different at different locations within the regenerators. In the operation of the invention with a typical glassmelting furnace, the temperatures within regenerator (200) at the start of the cycle may be on the order of 500 F. to 900 F. at the bottom of the regenerator and 1800 F. to 2300 F. at the top, and may be expected to rise by the end of this cycle to temperatures on the order of 600 F. to 1000 F. at the bottom and 1900 F. to 2400 F. at the top. In the same cycle, the temperatures within regenerator (700) at the start of the cycle may be on the order of 500 F. to 900 F. at the bottom of the regenerator and 1800 F. to 2300 F. at the top, and may be expected to rise by the end of this cycle to temperatures on the order of 600 F. to 1000 F. at the bottom and 1900 F. to 2300 F. at the top. In the same cycle, the temperatures within regenerator (100) at the start of the cycle may be on the order of 600 F. to 1000 F. at the bottom of the regenerator and 1900 F. to 2400 F. at the top, and may be expected to be cooled by the end of this cycle to temperatures on the order of 500 F. to 900 F. at the bottom and 1800 F. to 2300 F. at the top. In the same cycle, the temperatures within regenerator (600) at the start of the cycle may be on the order of 600 F. to 1000 F. at the bottom of the regenerator and 1900 F. to 2400 F. at the top, and may be expected to be cooled by the end of this cycle to temperatures on the order of 500 F. to 900 F. at the bottom and 1800 F. to 2300 F. at the top.

These figures would be expected if the cycle is reversed approximately every 20 minutes. When the cycle is reversed less often, the difference between the temperatures at the beginning and end of each cycle (100 F. in this example) would be expected to be larger, and even twice, i.e., about 200 F., as large as these figures if the cycles are reversed half as often, that is, every 40 minutes.

EXAMPLE 1

In a 350 tons per day (tpd) glassmelting furnace fired by natural gas combustion with oxygen ("oxy-fuel") using 2.6 MW of electric boost, the amount of cullet charged to the furnace corresponds to 50% of the glass produced by the furnace. Natural gas input is 38.1 MMBtu HHV/hr and the electric boost provides 8.4 MMBtu/hr of net energy to the furnace. Furnace wall heat losses are 6.4 MMBtu/hr and the molten glass produced in the furnace contains 23.4 MMBtu/hr of ensible and chemical energy. The balance of the heat balance is flue gas heat loss of 16.3 MMBtu HHV/hr at 2700 F. and flue port radiation loss of 0.3 MMBtu/hr.

Figure 7A:
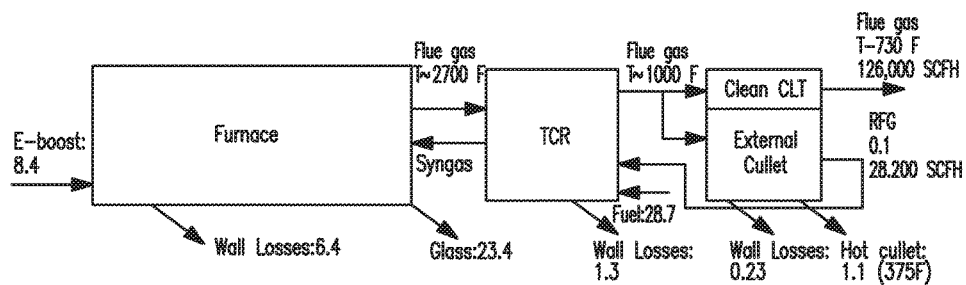
FIGS. 7a and 7b and 7c are schematic representations of embodiments of the present invention.

In the same furnace, equipped with a TCR and a downstream direct contact cullet preheater (20A) for further heat recovery all as shown in FIG. 1 and illustrated in FIG. 7a, hot flue gas at a temperature of 2700 F. exits the furnace and enters regenerator (200). With the combined TCR-cullet preheater system the fuel input is reduced by 24.7% to 28.7 MMBtu HHV/hr. The flue gas flow rate from the furnace is about 154,000 SCFH and the flue gas temperature exiting regenerator (200) is computed to be about 1000 F. If the flue gas temperature is too hot to directly introduce into the downstream cullet preheating station (20), water injection or flue gas recycle can be optionally used to modulate the flue gas temperature.

The flue gas from the regenerator (200) is split into two streams, (204) and (204A). Stream (204) is introduced into the cullet preheater station (20) which is also charged with post-consumer cullet (external cullet) containing organic impurities such as food residue and paper. About 70% of the cullet is post-consumer cullet and about 30% of the cullet is internally generated clean cullet in this example. At a RFG/NG mass ratio of 1, about 28,000 SCFH of flue gas is introduced into the station (20) and the cooled flue gas exiting station (20), which contains organic pyrolysis products, is recycled, mixed with reforming fuel, and injected into regenerator (100) for heat recovery, syngas formation, and destruction of the gaseous pyrolysis products in the checker pack. Stream (204) (126,000 SCFH) can be introduced into an optional heat recovery station such as a clean cullet preheater or batch preheater or waste heat boiler and exhausted to the atmosphere after passing through an appropriate flue gas cleaning system.

EXAMPLE 2

Figure 6:
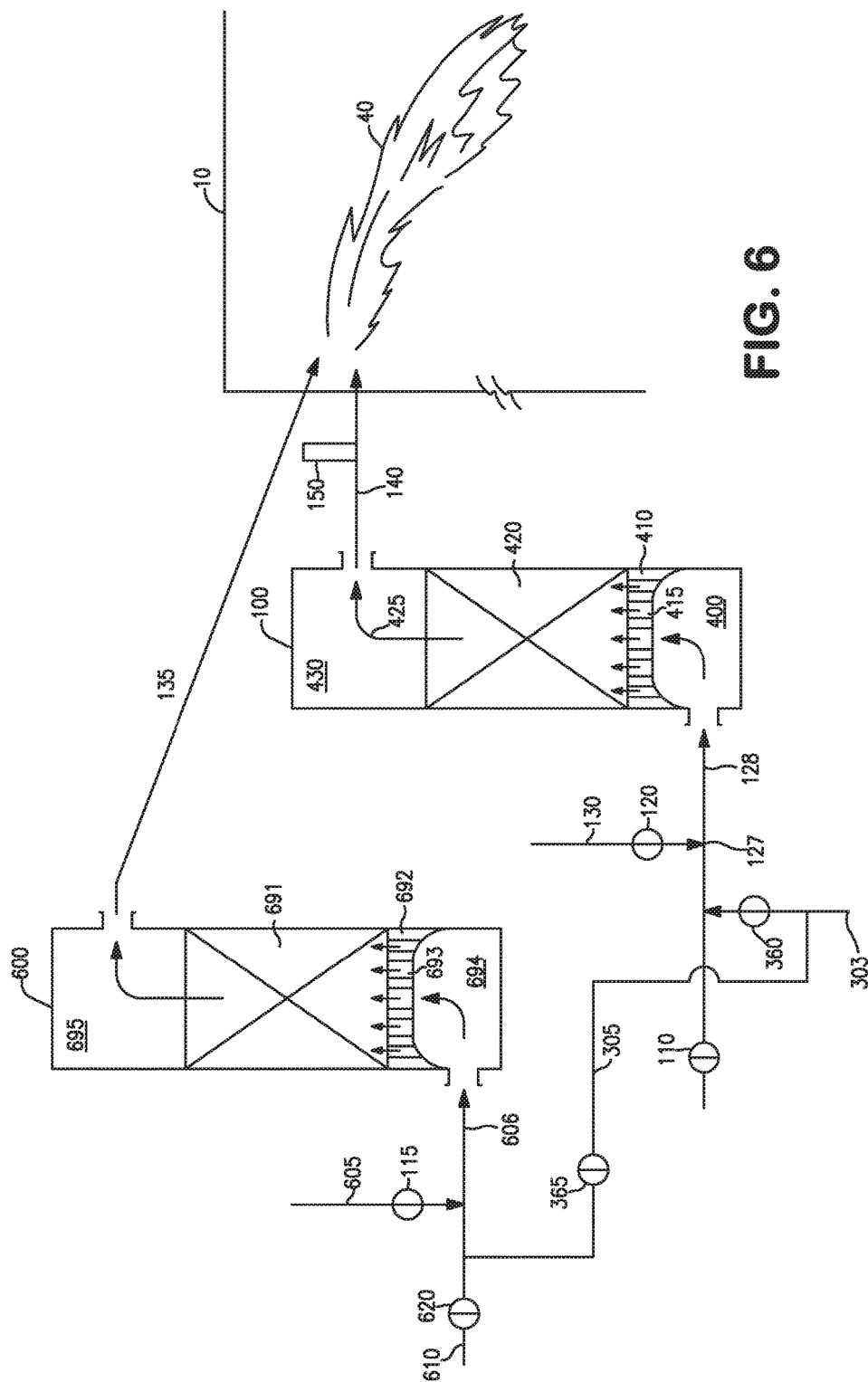
Figure 7B:
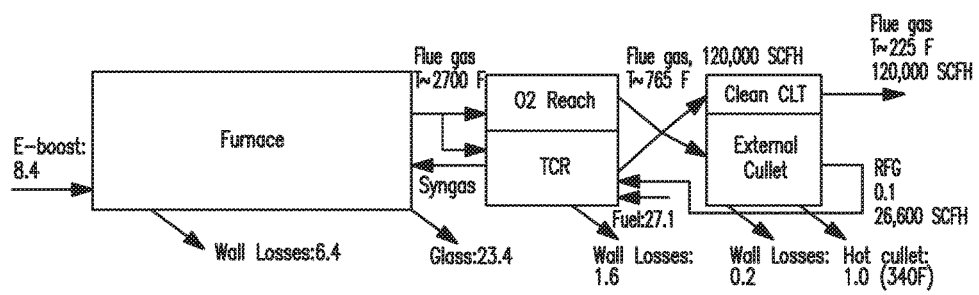

The same furnace as described in Example 1, was equipped with TCR, oxygen preheating regenerators, and cullet preheater section (20) as described in FIGS. 4-6 and illustrated in FIG. 7b. Hot flue gas at a temperature of 2700 F. exits the furnace and enters the regenerators (200) and (700). With the combined heat recovery system the fuel input is reduced by 28.9% to 27.1 MMBtu HHV/hr. The flue gas flow rate from the furnace is about 147,000 SCFH and the flue gas temperature after the dual O2-TCR is computed to be about 765 F. The flue gas from the regenerators (200) and (700) is split into streams, (204) and (204A). Stream (204) is used as the reforming reactants and introduced into a direct contact cullet preheater (20) charged with post-consumer cullet containing organic impurities such as food residue and paper. About 70% of the cullet is post-consumer cullet and about 30% of the cullet is internally generated clean cullet in this example. At a RFG/NG flow ratio of 1, about 27,000 SCFH of flue gas is introduced into preheater (20) and the cooled flue gas after preheater (20), which contains organic pyrolysis products, is recycled, mixed with reforming fuel, and injected into TCR regenerator (100) for heat recovery, syngas formation, and destruction of gaseous pyrolysis products in the checker pack. Stream (204A) (120,000 SCFH) is introduced into an optional heat recovery unit (20A) such as a clean cullet preheater or batch preheater or waste heat boiler and exhausted to the atmosphere after passing through an appropriate flue gas cleaning system.

The preferred range of the flow rate for stream (204) is determined in part from the preferred ratio of RFG to NG flow rates for the operation of TCR which is between 0.5 to 3. There is a preferred minimum flow rate of stream (204) to vaporize water and to pyrolyze organic matter in the cullet. Maximizing pyrolysis of organic matter is preferred because cullet containing organic matter affects the glass redox during melting in the furnace, and to minimize the variation of organic content in the cullet. By pyrolyzing organic matter in the cullet and batch, redox of the glass product becomes more stable, which is beneficial for the operation of the furnace.

EXAMPLE 3

Figure 7C:
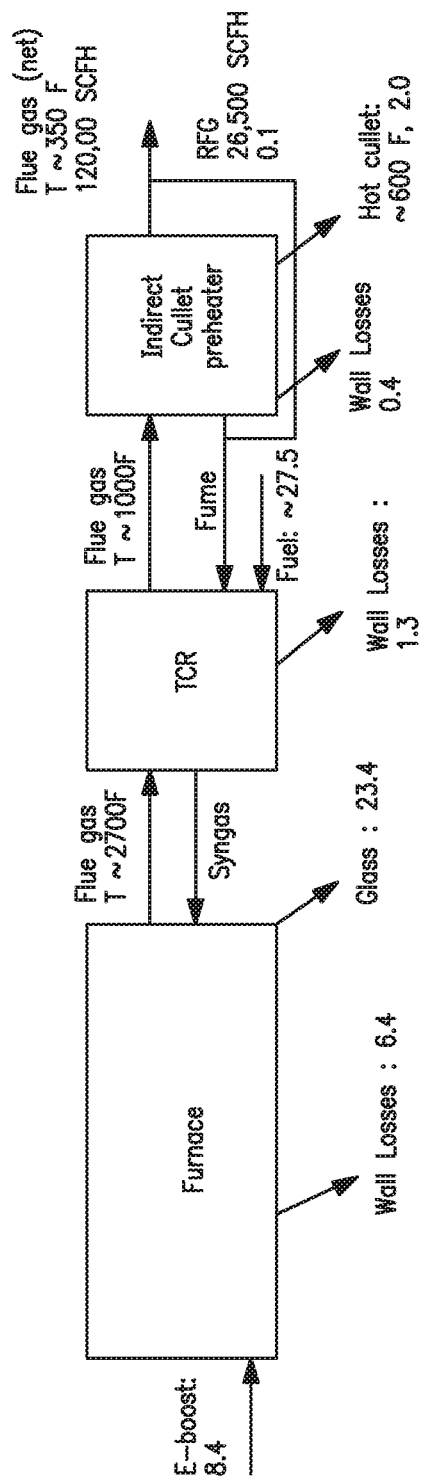

The same furnace as described in Example 1, was equipped with TCR, and indirect cullet preheater section (20) as described in FIG. 1a and illustrated in FIG. 7c. Hot flue gas at a temperature of 2700 F. exits the furnace and enters regenerator (200). With the combined TCR-indirect cullet preheater system the fuel input is reduced to about 27.5 MMBtu HHV/hr. The flue gas flow rate from the furnace is about 147,000 SCFH and the flue gas temperature exiting regenerator (200) is computed to be about 1000 F. If the flue gas temperature is too hot to directly introduce into the downstream cullet preheating station (20), water injection or flue gas recycle can be optionally used to modulate the flue gas temperature.

The flue gas from the regenerator (200) is introduced into the indirect cullet preheater station (20) which is charged with both internal and post-consumer cullet (external cullet) containing organic impurities such as food residue and paper. All of the flue gas is introduced into the station (20) and the organic pyrolysis products is mixed with recycled flue gas (RFG) and injected into regenerator (100) with reforming fuel for heat recovery, syngas formation, and destruction of the gaseous pyrolysis products in the checker pack.

What is claimed is:

1. A method of carrying out combustion in a glassmelting furnace, comprising
    (A) combusting fuel in a glassmelting furnace to produce gaseous combustion products, and
    (B) alternately carrying out (1)(a)-(1)(d) alternating with carrying out (2)(a)-(2)(d):
(1)(a) passing gaseous combustion products from the furnace into and through a cooled first regenerator to heat the first regenerator and cool said gaseous combustion products,
    (b) passing a first part of said cooled gaseous combustion products from said first regenerator in heat exchange with a first stream of solid glassmaking material which contains organic substances to further cool said first part of said cooled gaseous combustion products and heat the first stream of solid glassmaking material and pyrolyze organic substances contained thereon to form pyrolysis products, and
    passing a second part of said cooled gaseous combustion products from said first regenerator in heat exchange with a second stream of solid glassmaking material to further cool said second part of said cooled gaseous combustion products and heat the second stream of glassmaking material,
    (c) passing the further cooled gaseous combustion products, pyrolysis products, and fuel, into a heated second regenerator and, in the second regenerator, reacting the gaseous combustion products, pyrolysis products, and fuel in an endothermic reaction to form syngas comprising hydrogen and CO, and passing said syngas from the second regenerator into the furnace and combusting it in the furnace, and
    (d) feeding said heated first stream of solid glassmaking material and said heated second stream of gaseous combustion products into said furnace; and
(2)(a) passing gaseous combustion products from the furnace into and through a cooled second regenerator to heat the second regenerator and cool said gaseous combustion products, (b) passing a first part of said cooled gaseous combustion products from said second regenerator in heat exchange with a first stream of solid glassmaking material which contains organic substances to further cool said first part of said cooled gaseous combustion products and heat the first stream of solid glassmaking material and pyrolyze organic substances contained thereon to form pyrolysis products, and passing a second part of said cooled gaseous combustion products from said second regenerator in heat exchange with a second stream of solid glassmaking material to further cool said second part of said cooled gaseous combustion products and heat the second stream of glassmaking material, (c) passing the further cooled gaseous combustion products, pyrolysis products, and fuel, into a heated first regenerator and, in the first regenerator, reacting the gaseous combustion products and the fuel in an endothermic reaction to form syngas comprising hydrogen and CO, and passing said syngas from the first regenerator into the furnace and combusting it in the furnace, and (d) feeding said heated first stream of solid glassmaking material and said heated second stream of gaseous combustion products into said furnace.

2. A method according to claim 1 wherein in steps (B)(1)(b), or (B)(2)(b), or both, said heat exchange is direct.

3. A method according to claim 1 wherein in steps (B)(1)(b), or (B)(2)(b), or both, said heat exchange is indirect.

4. A method according to claim 1 wherein the further cooled gaseous combustion products from said first regenerator formed in said heat exchange thereof and the further cooled gaseous combustion products from said second regenerator formed in said heat exchange thereof contain pyrolysis products.

5. A method according to claim 1 wherein the further cooled gaseous combustion products from said first regenerator formed in said heat exchange thereof and the further cooled gaseous combustion products from said second regenerator formed in said heat exchange thereof do not contain pyrolysis products.

6. A method of carrying out combustion in a glassmelting furnace, comprising (A) combusting fuel in a glassmelting furnace to produce gaseous combustion products, and (B) alternately carrying out (1)(i)-(1)(vii) alternating with carrying out (2)(i)-(2)(vii):

(1) (i) passing a first amount of gaseous combustion products from the furnace into and through a cooled first regenerator to heat the first regenerator and cool said first amount of gaseous combustion products, (ii) passing a second amount of gaseous combustion products from the furnace into and through a cooled second regenerator to heat the second regenerator and cool said second amount of gaseous combustion products, (iii) passing cooled gaseous combustion products from said first regenerator, from said second regenerator, or from both said first and second regenerators, in heat exchange with solid glassmaking material which contains organic material, to further cool the cooled gaseous combustion products and heat the glasssmaking material and pyrolyze organic material in the glassmaking material, to form pyrolysis products, and feeding said heated glassmaking material into said furnace, (iv) passing reforming fuel, further cooled gaseous combustion products, pyrolysis products, and cooled gaseous combustion products from said first regenerator, cooled gaseous combustion products from said second regenerator, or cooled gaseous combustion products from both of said first and second regenerators, into a heated third regenerator, (v) reacting the gaseous combustion products and the reforming fuel and pyrolysis products in the third regenerator in an endothermic reaction under conditions effective to form syngas comprising hydrogen and carbon monoxide, and thereby cooling the third regenerator, (vi) passing gaseous oxidant into and through a heated fourth regenerator to heat the gaseous oxidant and cool the fourth regenerator, and (vii) passing said syngas and any unreacted pyrolysis products from said third regenerator into said furnace, passing said heated gaseous oxidant from the fourth regenerator into the furnace, and combusting the syngas, any unreacted pyrolysis products, and said heated gaseous oxidant in the furnace;

while maintaining the difference in temperatures of the combustion products passing out of said first and second regenerators at 300 F. or less; and (2) (i) passing a first amount of gaseous combustion products from the furnace into and through a cooled third regenerator to heat the third regenerator and cool said first amount of gaseous combustion products, (ii) passing a second amount of gaseous combustion products from the furnace into and through a cooled fourth regenerator to heat the fourth regenerator and cool said second amount of gaseous combustion products, (iii) passing cooled gaseous combustion products from said third regenerator, from said fourth regenerator, or from both said third and fourth regenerators, in heat exchange with solid glassmaking material which contains organic material, to further cool the cooled gaseous combustion products and heat the glassmaking material and pyrolyze organic material in the glassmaking material, to form pyrolysis products, and feeding said heated glassmaking material into said furnace, (iv) passing reforming fuel, further cooled gaseous combustion products, pyrolysis products, and cooled gaseous combustion products from said third regenerator, cooled gaseous combustion products from said fourth regenerator, or cooled gaseous combustion products from both of said third and fourth regenerators, into a heated first regenerator, (v) reacting the gaseous combustion products and the reforming fuel and pyrolysis products in the first regenerator in an endothermic reaction under conditions effective to form syngas comprising hydrogen and carbon monoxide, and thereby cooling the first regenerator, (vi) passing gaseous oxidant into and through a heated second regenerator to heat the gaseous oxidant and cool the second regenerator, and (vii) passing said syngas and any unreacted pyrolysis products from said first regenerator into said furnace, passing said heated gaseous oxidant from the second regenerator into the furnace, and combusting the syngas, any unreacted pyrolysis products, and said heated gaseous oxidant in the furnace;

while maintaining the difference in temperatures of the combustion products passing out of said third and fourth regenerators at 300 F. or less.

7. A method according to claim 6 wherein in steps (B)(1)(iii), or (B)(2)(iii), or both, said heat exchange is direct.

8. A method according to claim 6 wherein in steps (B)(1)(iii), or (B)(2)(iii), or both, said heat exchange is indirect.

9. A method according to claim 6, further comprising alternately passing a portion of said cooled gaseous combustion products from said first regenerator, from said second regenerator, or from both said first and second regenerators, in heat exchange with a second stream of solid glassmaking material to further cool said portion of cooled gaseous combustion products and heat the second stream of glassmaking material, and feeding said heated second stream of glassmaking material into said furnace; and passing a portion of said cooled gaseous combustion products from said third regenerator, from said fourth regenerator, or from both said third and fourth regenerators, in heat exchange with a second stream of solid glassmaking material to further cool said portion of cooled gaseous combustion products and heat the second stream of glassmaking material, and feeding said heated second stream of glassmaking material into said furnace.

10. A method according to claim 6, wherein the further cooled gaseous combustion products from said first regenerator, from said second regenerator, or from both said first and second regenerators, formed in heat exchange thereof, contain pyrolysis products, and the further cooled gaseous combustion products from said third regenerator, from said fourth regenerator, or from both said third and fourth regenerators, formed in said heat exchange thereof, contain pyrolysis products.

11. A method according to claim 6 wherein the cooled gaseous combustion products from said first regenerator, from said second regenerator, or from both said first and second regenerators, and the cooled gaseous combustion products from said third regenerator, from said fourth regenerator, or from both said third and fourth regenerators, are further cooled in indirect heat exchange thereof, and said indirect heat exchange does not form pyrolysis products therein.

* * * * *